United States Patent
Shirahata

(10) Patent No.: US 9,943,966 B2
(45) Date of Patent: Apr. 17, 2018

(54) PROCESSING MACHINE SYSTEM CAPABLE OF REMOVING CHIPS PRODUCED FROM MACHINING

(71) Applicant: FANUC CORPORATION, Minamitsuru-gun, Yamanashi (JP)

(72) Inventor: Toru Shirahata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 267 days.

(21) Appl. No.: 15/066,059

(22) Filed: Mar. 10, 2016

(65) Prior Publication Data

US 2016/0263745 A1 Sep. 15, 2016

(30) Foreign Application Priority Data

Mar. 13, 2015 (JP) ................. 2015-051311

(51) Int. Cl.
*B23Q 11/00* (2006.01)
*B25J 9/16* (2006.01)
*B25J 11/00* (2006.01)

(52) U.S. Cl.
CPC ............ *B25J 9/1697* (2013.01); *B25J 11/00* (2013.01); *B23Q 11/0053* (2013.01); *G05B 2219/39543* (2013.01); *Y02P 70/171* (2015.11); *Y10S 901/02* (2013.01); *Y10S 901/30* (2013.01); *Y10S 901/47* (2013.01)

(58) Field of Classification Search
CPC ............ B23Q 11/0042; B23Q 11/0053; B23Q 11/0057; B23Q 11/0067; B23Q 11/0075; B25J 9/1697; B25J 11/00; G05B 2219/39543; Y02P 70/171; Y10S 901/02; Y10S 901/27; Y10S 901/30; Y10S 901/47
See application file for complete search history.

(56) References Cited

U.S. PATENT DOCUMENTS

| | | | | |
|---|---|---|---|---|
| 4,586,869 | A | * | 5/1986 | Nihei ...................... B25J 15/10 294/86.4 |
| 5,259,722 | A | * | 11/1993 | Inoue .................. B25J 17/0283 269/71 |
| 6,059,494 | A | | 5/2000 | Susnjara |
| 9,403,278 | B1 | | 8/2016 | Van Kampen et al. |
| 2016/0151915 | A1 | * | 6/2016 | Nishi ..................... B25J 9/1692 700/247 |

(Continued)

FOREIGN PATENT DOCUMENTS

| | | |
|---|---|---|
| JP | 06297292 A | 10/1994 |
| JP | 07108435 A | 4/1995 |

(Continued)

*Primary Examiner* — Stephen W Smoot
(74) *Attorney, Agent, or Firm* — RatnerPrestia

(57) ABSTRACT

A processing machine system includes a processing machine having a machining table, a robot that removes chips produced from processing of the work, a chip collecting hand attached to a distal end portion of the robot to collect the chips, and a robot control unit. The robot control unit acquires a deposition amount of the chips deposited on the machining table, decides whether it is necessary to collect the chips on the basis of the acquired deposition amount. When the chip collection is necessary, the robot control unit operates the robot so as to collect the chips with the chip collecting hand, after the processing is finished.

6 Claims, 9 Drawing Sheets

(56) References Cited

U.S. PATENT DOCUMENTS

| | | | | |
|---|---|---|---|---|
| 2016/0184947 A1* | 6/2016 | Itou | ............... | B23Q 11/0046 15/319 |
| 2016/0263687 A1* | 9/2016 | Matsunaga | ............. | B23H 1/10 |
| 2016/0311076 A1* | 10/2016 | Matsumoto | ........ | B23Q 11/0075 |
| 2017/0113314 A1* | 4/2017 | Murota | ................. | B08B 5/02 |
| 2017/0165803 A1* | 6/2017 | Nakayama | ......... | B23Q 11/0075 |

FOREIGN PATENT DOCUMENTS

| | | |
|---|---|---|
| JP | 07256550 A | 10/1995 |
| JP | 08150537 A | 6/1996 |
| JP | 08174372 A | 7/1996 |
| JP | 2001054836 A | 2/2001 |
| JP | 2001-322049 A | 11/2001 |
| JP | 2005-231008 A | 9/2005 |
| JP | 2009297861 A | 12/2009 |
| JP | 2010-105065 | 5/2010 |
| JP | 2013146651 A | 8/2013 |
| JP | 2014213434 A | 11/2014 |
| JP | 2015016515 A | 1/2015 |
| JP | 2015024454 A | 2/2015 |
| JP | 2016120580 A | 7/2016 |
| JP | 2016120589 A | 7/2016 |

* cited by examiner

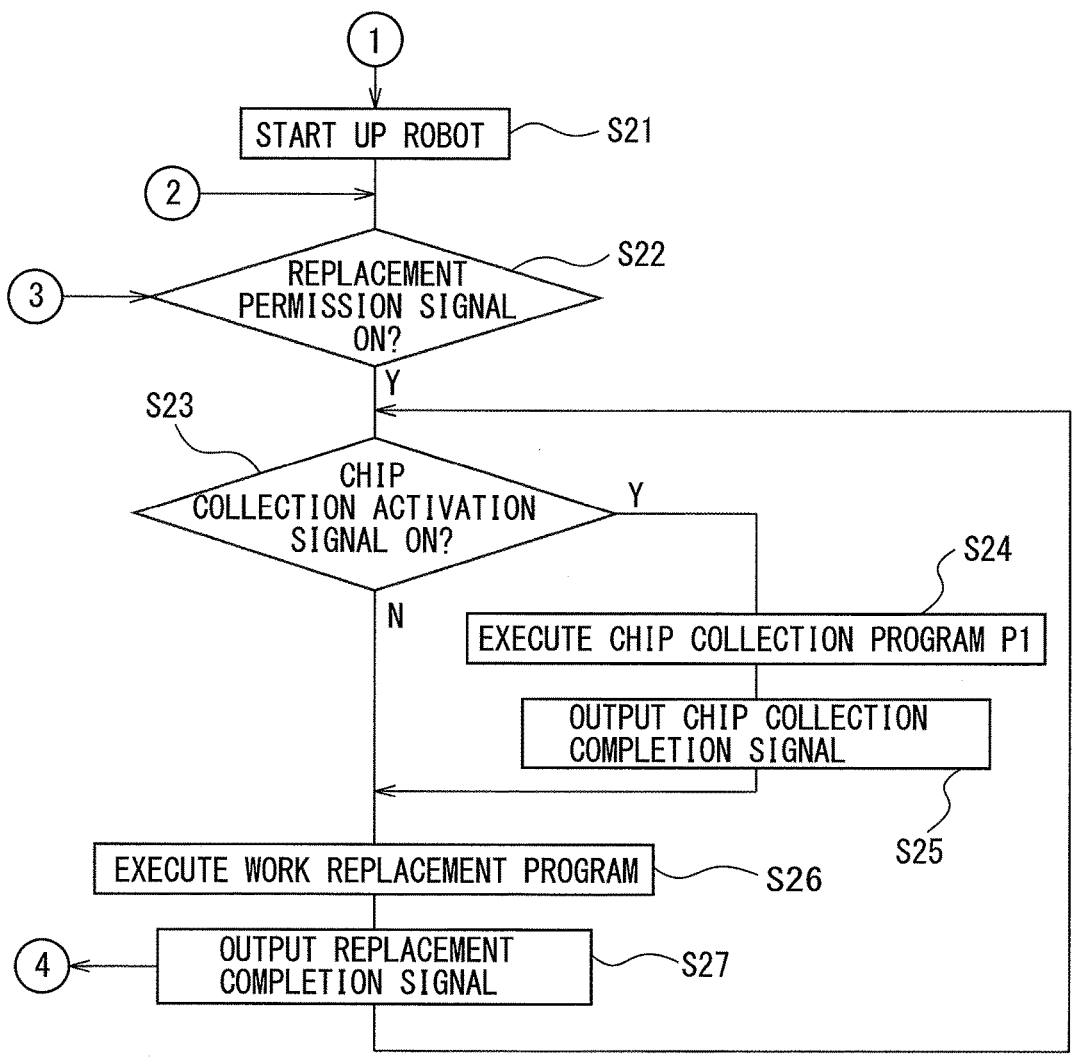

PROCESSING MACHINE SYSTEM CAPABLE OF REMOVING CHIPS PRODUCED FROM MACHINING

BACKGROUND OF THE INVENTION

1. Field of the Invention

The present invention relates to a processing machine system capable of removing chips produced from machining, and more particularly to a processing machine system including a robot that removes the chips deposited in the processing machine.

2. Description of the Related Art

When a processing machine such as a lathe or a machining center processes a work, chips are produced from the processing and hence the chips have to be discharged out of the processing machine. This is because deposition of the chips on the work or a fixing jig results in problems such as degradation in processing accuracy and breakdown of a machining tool. When dry processing or semi dry processing is performed, in particular, the chips are unable to be transported with a coolant out of the machine, and therefore a large amount of chips are prone to be accumulated inside the processing machine.

To avoid the above-mentioned problem some measures have to be taken, for example periodically stopping the processing machine and removing the chips in the processing machine. However, such a remedy not only leads to lowered production efficiency, but also impedes execution of automated production.

When wet processing which employs a coolant is performed, the coolant has to be made to flow over the region where the chips are produced so as to transport the chips out of the machine, and then the chips have to be separated from the coolant, for example using a chip conveyor. Moreover, since the chips are scattered over a large area during the processing, a large volume of coolant has to be supplied to the chip producing locations without omission. However, when the amount of coolant is insufficient or when the coolant is supplied to a wrong location, the chips may be deposited on the fixing jig that holds the work or other locations. When the wet processing is performed also, therefore, the operator has to periodically remove the chips inside the processing machine.

Therefore, a processing machine that enables the chips in the processing machine to be periodically removed without depending on human power is being sought for. Thus, processing machines configured to remove the chips produced therein are proposed, for example, in Japanese Laid-open Patent Publication No. 2005-231008, Japanese Laid-open Patent Publication No. 2010-105065, and Japanese Laid-open Patent Publication No. 2001-322049.

Japanese Laid-open Patent Publication No. 2005-231008 discloses a dry processing machine including a cut chip pressing apparatus that compresses chips discharged from a machining section into a lump, to thereby discharge the chips in the form of the lump.

Japanese Laid-open Patent Publication No. 2010-105065 discloses an NC lathe including a mechanism and a cover that facilitate collection of chips.

Japanese Laid-open Patent Publication No. 2001-322049 discloses a chip cleaning apparatus including a cleaning robot disposed inside a processing machine during dry processing, the cleaning robot including a suction nozzle that sucks the chips during the processing.

However, with the dry processing machine according to Japanese Laid-open Patent Publication No. 2005-231008, a special chip pressing apparatus has to be added to the processing machine. In addition, the chips scattered to a region outside a specific area are unable to be compressed with the cut chip pressing apparatus. Accordingly, to remove such chips the operator has to stop the processing machine and transport the chips out of the machine. Thus, the dry processing machine according to Japanese Laid-open Patent Publication No. 2005-231008 is still unable to improve the production efficiency or realize automated production.

Although the NC lathe according to Japanese Laid-open Patent Publication No. 2010-105065 includes the cover to facilitate the operator to collect the chips, an apparatus for transporting the chips out of the machine is not provided. Therefore, the NC lathe is unable to improve the production efficiency or realize automated production, either.

In the chip cleaning apparatus according to Japanese Laid-open Patent Publication No. 2001-322049, the suction nozzle is located close to a machining tool, to suck the chips at the same time that the processing is performed. However, the suction nozzle generates the suction force unidirectionally, and hence it is difficult to such all the chips scattered over a broad area from the tip of the machining tool. Accordingly, when the chips are sucked at the same time as the processing, the chips may remain on the fixing jig that holds the work and the periphery of the fixing jig. In this case, the operator has to stop the processing machine and remove the chips.

Further, since the chips are sucked at the same time as the processing in the chip cleaning apparatus according to Japanese Laid-open Patent Publication No. 2001-322049, the cleaning robot has to be controlled in a complicated manner so as to avoid interference between the suction nozzle and the machining tool. In addition, there may be locations unable to be cleaned at the same time as the processing. In other words, when the chips are sucked at the same time as the processing, some locations may be left uncleaned and an additional time may be required for the cleaning, which leads to degradation in production efficiency.

SUMMARY OF INVENTION

The present invention provides a processing machine system that realizes long-time unmanned operation and improves the production efficiency.

In a first aspect, the present invention provides a processing machine system including a processing machine configured to processes a work and including a machining table that holds the work, a robot including a chip collecting hand that collects chips deposited on the machining table, and a control unit that controls movement and operation of the chip collecting hand. The control unit is configured to acquire a deposition amount of the chips produced from the processing of the work and deposited on the machining table, decide whether it is necessary to collect the chips on a basis of the acquired deposition amount, and cause the robot, upon deciding that chip collection is necessary, to collect the chips with the chip collecting hand, after the processing is finished.

In a second aspect, the present invention provides the processing machine system of the first aspect, in which the control unit is configured to acquire the deposition amount of the chips deposited on the machining table on a basis of information in a processing program utilized for processing the work.

In a third aspect, the present invention provides the processing machine system of the first aspect, further including a visual sensor, and in which the control unit is configured to acquire, using the visual sensor, the deposition amount and a deposition region of the chips deposited on the machining table, and cause the robot, upon deciding that the chip collection is necessary, to collect the chips in the acquired deposition region with the chip collecting hand, after the processing is finished.

In a fourth aspect, the present invention provides the processing machine system of the third aspect, in which the control unit is configured to acquire, using the visual sensor, the deposition amount and the deposition region of the chips deposited on the machining table after collecting the chips in the acquired deposition region with the chip collecting hand, decide whether it is necessary to collect the chips on a basis of the acquired deposition amount, and collect, upon deciding that chip collection is necessary, the chips in the deposition region with the chip collecting hand.

In a fifth aspect, the present invention provides the processing machine system of the third or the fourth aspect, in which the visual sensor is attached to the robot, the robot being located outside a casing of the processing machine, and the control unit is configured to cause the robot to acquire the deposition amount and the deposition region of the chips deposited on the machining table, so as to introduce the visual sensor into inside of the casing from outside after the processing is finished.

In a sixth aspect, the present invention provides the processing machine system of any of the first to the fifth aspects, further including a fixing jig that maintains the work, the fixing jig being mounted on the machining table, and a cleaning brush movably attached to a distal end portion of the robot, and in which the control unit is configured to cause the robot to remove the work from the fixing jig and to clean the fixing jig with the cleaning brush, after collecting the chips with the chip collecting hand.

These and other objects, features, and advantages of the present invention will become more apparent through detailed description of exemplary embodiments of the present invention illustrated in the accompanying drawings.

BRIEF DESCRIPTION OF THE DRAWINGS

FIG. 2B is a flowchart representing the remaining part of the operation flow of the processing machine system according to the first embodiment;

DETAILED DESCRIPTION

Figure 1:
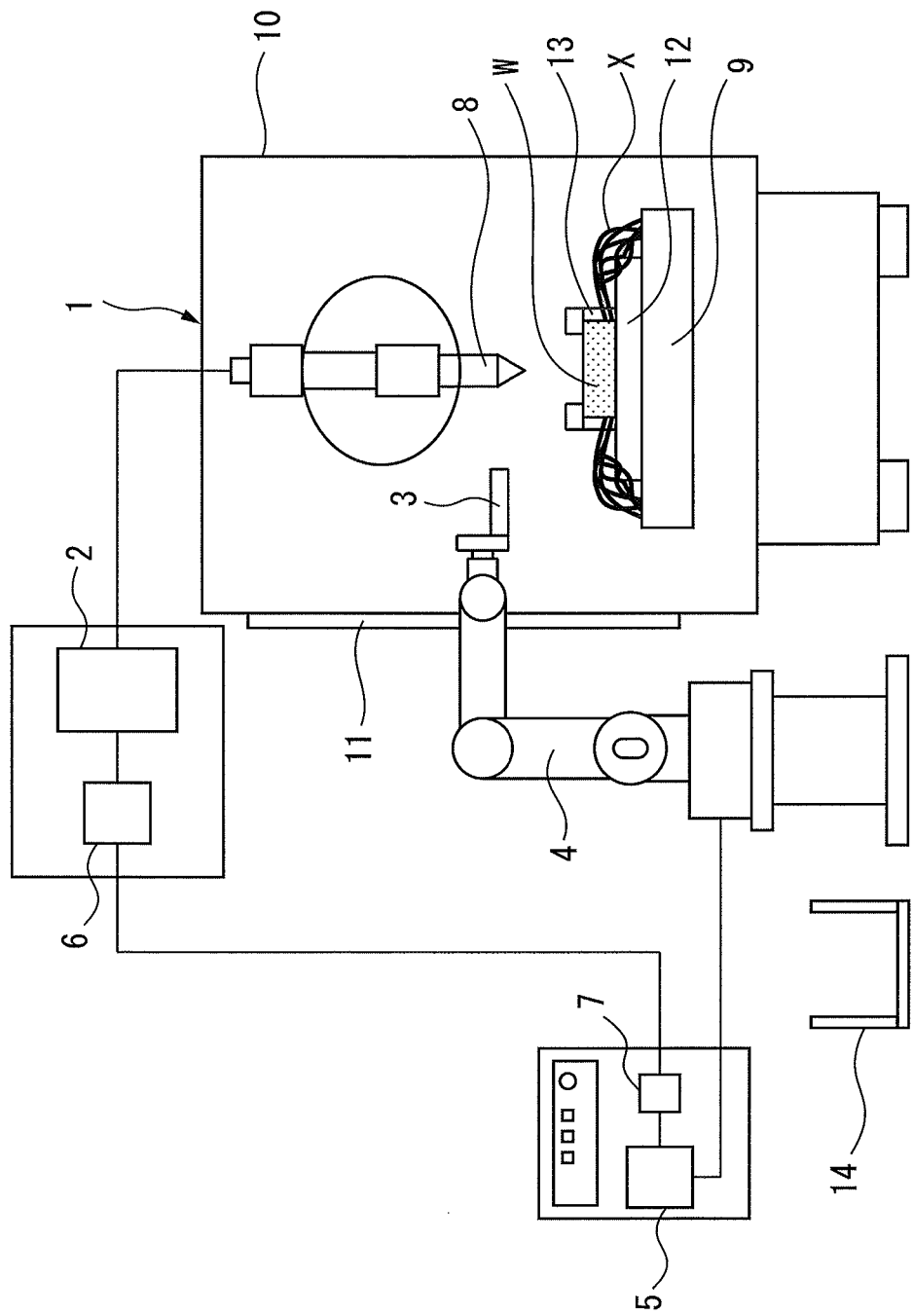
FIG. 1 is a schematic front view illustrating a processing machine system according to a first embodiment.

Hereafter, embodiments of the present invention will be described with reference to the drawings. In the drawings, the same constituents are given the same reference numeral. For the sake of clarity, the constituents may be illustrated in different scales. It should be noted that the configuration of a processing machine system illustrated in each drawing is merely an example, and that the present invention is not limited to the illustrated configuration.

First Embodiment

FIG. 1 is a schematic front view illustrating a processing machine system according to a first embodiment.

Referring to FIG. 1, the processing machine system according to the first embodiment includes a processing machine 1 configured to perform dry processing or semi dry processing, a processing machine control unit 2 that controls the processing machine 1, a robot 4 including a chip collecting hand 3 attached to a distal end portion of the robot, and a robot control unit 5 that controls the robot 4. The processing machine system according to the first embodiment also includes a processing machine communication unit 6 and a robot communication unit 7 for making communication between the processing machine control unit 2 and the robot control unit 5.

The processing machine 1 includes a machining tool 8 that performs processing such as drilling and cutting, and a machining table 9 that moves a work W to be processed, the machining tool 8 and the machining table 9 being installed inside a casing 10. A door 11 is provided on a side face of the casing 10. The work W is an object to be processed, formed of a metal material or a resin material. On the machining table 9, a pedestal 12 on which the work W is to be placed, and a fixing jig 13 that maintains the work W in position on the pedestal 12 are provided. The fixing jig 13 includes a clamp mechanism. The fixing jig 13 is removably fixed on the machining table 9. In order to explicitly illustrate the configuration inside the casing 10 in FIG. 1, the machining tool 8, the work W, the machining table 9, the pedestal 12, and the fixing jig 13 are drawn in solid lines, as if the wall of the casing 10 were transparent.

The robot 4 is installed outside the processing machine 1. The robot 4 may be, for example, a vertically articulated robot. The chip collecting hand 3 is attached to the distal end portion of the robot 4. When the door 11 on the side face of the casing 10, the robot 4 can be operated so as to introduce the chip collecting hand 3 into inside of the casing 10 from outside, and to withdraw the chip collecting hand 3 from inside of casing 10. The chip collecting hand 3 collects chips X in the casing 10 by a grabbing or scooping motion. A dust box 14 for storing the chips collected by the chip collecting hand 3 is installed in the vicinity of a base portion of the robot 4. Although the robot 4 is installed outside the casing 10 in this embodiment, the robot 4 may be installed inside the casing 10 of the processing machine 1.

The processing machine control unit 2 contains a plurality of processing programs in which information necessary for the processing of the work W, such as processing routes, processing product types, and machining tools is described, and a plurality of chip collection programs P1 associated with the respective processing programs, and in which regions from which the chips are to be collected with the chip collecting hand 3 are specified.

Further, the processing machine control unit 2 decides whether it is necessary to collect the chips, after processing the work W according to the processing program. Upon deciding that the chip collection is necessary, the processing machine control unit 2 operates the chip collecting hand 3 according to the chip collection program P1 associated with the processing program, to thereby collect the chips.

Upon deciding that the chip collection is necessary, the processing machine control unit 2 also opens the door 11 on the side face of the casing 10, after the processing of the work W is finished. Further, the processing machine control unit 2 notifies the robot control unit 5 that the door 11 has been opened, through the processing machine communication unit 6 and the robot communication unit 7.

The robot control unit 5 introduces the chip collecting hand 3 into inside of the casing 10 through the side face thereof, according to the chip collection program P1. The robot control unit 5 also operates the chip collecting hand 3 of the robot 4 so as to collect the chips on the fixing jig 13 and the periphery thereof in the casing 10. In this process, the chip collecting hand 3 collects the chips by a grabbing motion or a scooping motion. Then the robot control unit 5 moves the chip collecting hand 3 to the dust box 14 located outside the casing 10, and operates the chip collecting hand 3 so as to drop the chips held by the chip collecting hand 3 into the dust box 14. In addition, the robot control unit 5 operates the robot 4 so as to replace the processed work W in the casing 10 with an unprocessed work W.

Further, the robot control unit 5 notifies the processing machine control unit 2 that the removal of the chips in the casing 10 has been finished, through the robot communication unit 7 and the processing machine communication unit 6. After that, the processing machine control unit 2 closes the door 11 on the side face of the casing 10. Further, the processing machine control unit 2 operates the machining tool 8 and the machining table 9 according to the processing program, so as to process the unprocessed work W.

Figure 2A:
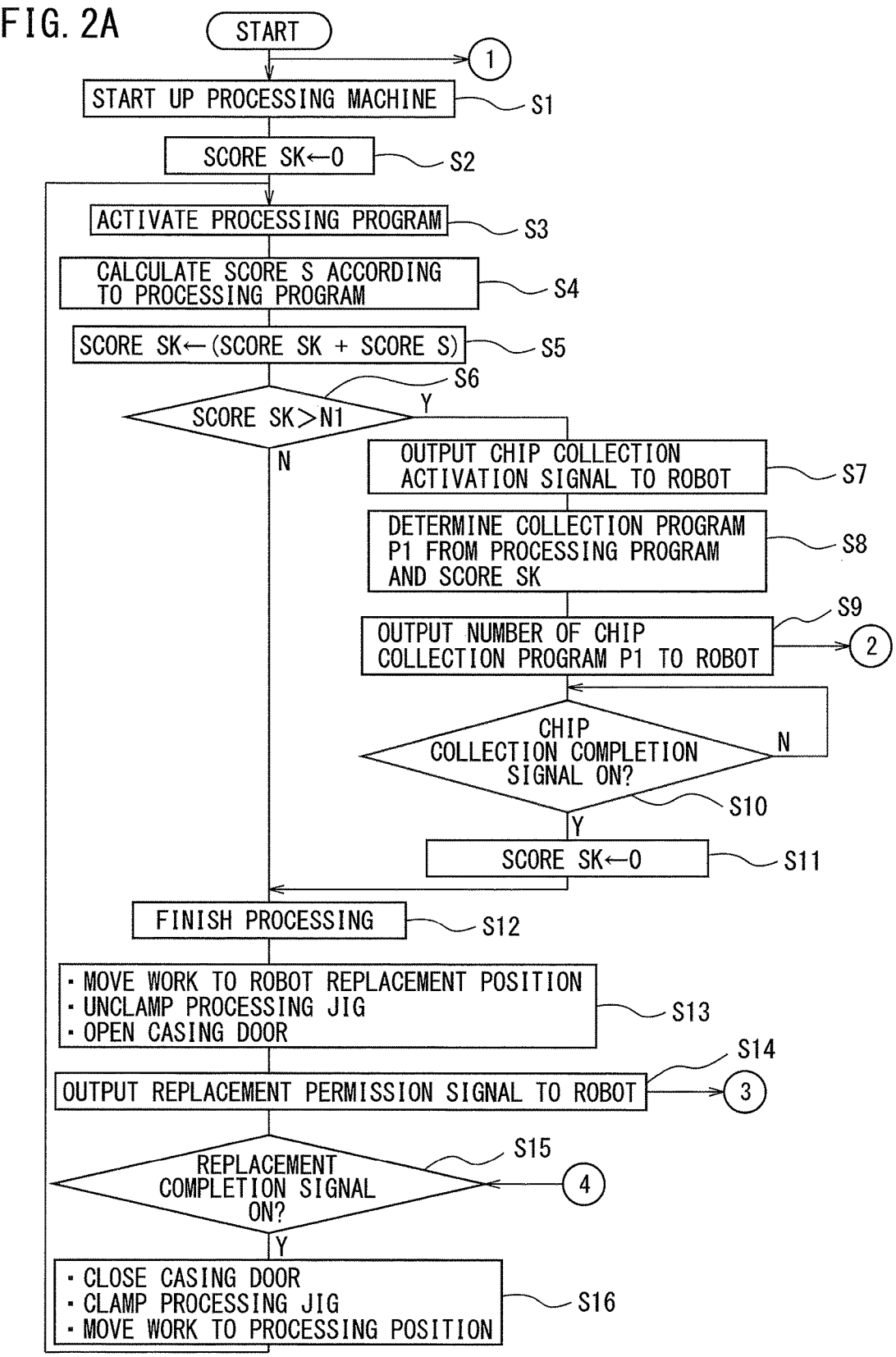
FIG. 2A is a flowchart representing a part of the operation flow of the processing machine system according to the first embodiment.

Hereunder, the operation of the processing machine system according to the first embodiment will be described in further details. FIG. 2A and FIG. 2B are flowcharts representing the operation flow of the processing machine system according to the first embodiment. The operation flow of the processing machine system according to the first embodiment is dividedly illustrated in FIG. 2A and FIG. 2B. Connectors of the same numeral in FIG. 2A and FIG. 2B indicate the stages where the operation flow illustrated in the respective drawings are combined. It will be assumed that, in the initial state of the following operation flow, the chips are not present inside the processing machine 1, and that the unprocessed work W is held by the fixing jig 13.

When the operator presses a non-illustrated start button of the processing machine system, or a starting instruction is transmitted to the processing machine system from outside, the processing machine control unit 2 starts up the processing machine 1, so as to activate the machining tool 8 to start the processing of the work W (step S1 in FIG. 2A). In addition, the robot control unit 5 starts up the robot 4 (step S21 in FIG. 2B).

Then the processing machine control unit 2 initializes a score SK for evaluating the chip deposition amount (step S2 in FIG. 2A). In other words, the score SK is reset to zero. Here, the score SK refers to an index of the level of the chip deposition amount evaluated according to the extent of the deposition. A higher score SK represents a larger chip deposition amount.

The processing machine control unit 2 then activates the processing program corresponding to the processing of the work W (step S3 in FIG. 2A). The processing program contains processing conditions, processing routes, processing speed, and other types of information. The processing machine control unit 2 calculates and acquires a score S for evaluating a discharge amount of the chips according to the processing program (step S4 in FIG. 2A). Here, the score S refers to an index of the level of the chip discharge amount evaluated according to the extent of the discharge amount, and a higher score S represents a larger amount of the chips produced from the work by performing the processing program.

The calculation method of the score S based on the processing program will be subsequently described.

Then the processing machine control unit 2 adds the acquired score S to the score SK and obtains the result (step S5 in FIG. 2A). After that, the processing machine control unit 2 compares the score SK obtained as above with a preset value N1 (step S6 in FIG. 2A). When the calculated score SK is higher than the preset value N1, the processing machine control unit 2 outputs a chip collection activation signal to the robot control unit 5 (step S7 in FIG. 2A). Here, the preset value N1 is a threshold for deciding whether the chips deposited on the machining table 9 have to be collected. The preset value N1 will hereafter be referred to as deposition limit.

When the score SK is equal to or lower than the deposition limit N1 at step S6, it is decided that the chip collection is unnecessary. Therefore, step S12 follows the process of step S6.

After step S7, the processing machine control unit 2 determines the chip collection program P1 on the basis of the processing program and the score SK (step S8 in FIG. 2A).

More specifically, the plurality of chip collection programs P1 respectively associated with the plurality of processing programs are prepared in advance and stored in the robot control unit 5. Numbers are respectively given to the processing programs and the chip collection programs P1. On the part of the processing machine control unit 2, the plurality of processing programs each having the number, and the numbers of the respective chip collection programs P1 associated with the processing programs are stored. Further, the score SK calculated at step S5 and the number of the processing program used for the calculation of the score SK are stored in association with each other, in the processing machine control unit 2.

Therefore, the processing machine control unit 2 can determine, when the score SK is inputted, the number of the chip collection program P1 associated with the processing program used for calculating the score SK. In other words, one of the plurality of chip collection programs P1 in the robot control unit 5 is selected.

In the chip collection program P1, a range over which the chip collecting hand 3 is to be moved with respect to the machining table 9, and the operation of the chip collecting hand 3 are specified. The preparation method of the chip collection program P1 will be subsequently described.

Further, the processing machine control unit 2 outputs the number of the chip collection program P1 to the robot control unit 5 (step S9 in FIG. 2A). The processing machine control unit 2 then stands by for a chip collection completion signal indicating the completion of the chip collection, from the robot control unit 5 (step S10 in FIG. 2A). When the chip collection completion signal is inputted, the processing machine control unit 2 initializes the score SK (step S11 in FIG. 2A). Thereafter, the processing of the work W is completed when the processing program working thus far is finished (step S12 in FIG. 2A).

After step S12, the processed work W is replaced with an unprocessed work W. For this purpose, the processing machine control unit 2 drives the machining table 9 so as to place the processed work W at a non-illustrated work replacement position in the processing machine 1 (step S13 in FIG. 2A). In this embodiment, the processed work W is held by the clamp mechanism of the fixing jig 13 while being carried to the work replacement position. After the processed work W is moved to the work replacement position, the processing machine control unit 2 releases the processed work W from the clamp mechanism of the fixing jig 13. In addition, the processing machine control unit 2 opens the door 11 of the casing 10 of the processing machine 1.

Further, the processing machine control unit 2 outputs a replacement permission signal for permitting the replacement of the work W, to the robot control unit 5 (step S14 in FIG. 2A). The processing machine control unit 2 then stands by for a replacement completion signal indicating the completion of the replacement of the work W, from the robot control unit 5 (step S15 in FIG. 2A).

On the other hand, the robot 4 is ready to start the operation (step S21 in FIG. 2B). As illustrated in FIG. 2B, the robot control unit 5 checks whether the replacement permission signal has been inputted after step S21 (step S22 in FIG. 2B). Upon deciding that the replacement permission signal has been inputted, the robot control unit 5 checks whether the chip collection activation signal has been inputted (step S23 in FIG. 2B). When the chip collection activation signal is inputted, the robot control unit 5 executes the chip collection program P1 outputted at step S9 in FIG. 2A (step S24 in FIG. 2B). The robot control unit 5 then moves and operates the chip collecting hand 3 according to the chip collection program P1, thereby removing the chips on the work W and in the periphery of the fixing jig 13, inside the casing 10.

After step S24, the robot control unit 5 outputs the chip collection completion signal indicating the completion of the chip collection (step S25 in FIG. 2B). Then the robot control unit 5 executes the work replacement program (step S26 in FIG. 2B). When the chip collection activation signal is not inputted at step S23, the work replacement program is immediately executed.

The chip collecting hand 3 according to this embodiment possesses a grab function for replacing the work. Therefore, the robot control unit 5 can replace the processed work W on the work replacement position with an unprocessed work W, using the grab function of the chip collecting hand 3.

When the grab function is not provided in the chip collecting hand 3, the robot control unit 5 replaces the chip collecting hand 3 attached to the distal end portion of the robot 4 with a work replacing hand, using a non-illustrated hand changer. Then the work replacing hand replaces the processed work W on the work replacement position with the unprocessed work W. After the replacement of the work, the work replacing hand is replaced with the chip collecting hand 3.

After the replacement of the work W, the robot control unit 5 outputs the replacement completion signal to the processing machine control unit 2 (step S27 in FIG. 2B). On the other hand, the processing machine control unit 2 checks whether the replacement completion signal has been inputted (step S15 in FIG. 2A). When the replacement completion signal is inputted, the processing machine control unit 2 closes the door 11 of the casing 10 of the processing machine 1, and maintains the work W with the clamp mechanism of the fixing jig 13. Further, the processing machine control unit 2 drives the machining table 9 so as to move the work W from the work replacement position to the processing position (step S16 in FIG. 2A). The processing machine control unit 2 then returns to step S3, and activates the processing program corresponding to the unprocessed work W which has been replaced.

In the first embodiment described above, the processing machine control unit 2 serves to make the decision whether the chip collection is necessary (step S4 to step S6) and to select the chip collection program P1 for moving and operating the chip collecting hand 3 (step S7 to step S11). Alternatively, those steps may be performed by the robot control unit 5.

In the first embodiment, the chip deposition amount is acquired on the basis of the description in the processing program, and whether the chip collection is necessary is decided depending on the deposition amount thus acquired. When it is decided that the chip collection is necessary, the robot is activated after the processing is finished, to collect the chips using the chip collecting hand. Thus, the chip collection is performed only when the chip collection is necessary after the processing is finished, and therefore the idle time can be reduced and the production efficiency can be improved. In addition, the work to be performed by the operator to stop the processing machine and remove the chips can be minimized. Therefore, long-time unmanned operation can be realized, which leads to reduction in production cost. Further, there is no need to provide a device for detecting the chip deposition amount in the vicinity of the distal end portion of the robot 4 in the first embodiment, and therefore the processing machine system can be manufactured at a lower cost.

The calculation method of the score S will now be described hereunder.

In the first embodiment, the score S for evaluating the chip discharge amount is calculated by looking up the processing program, as described with reference to step S4 in FIG. 2A. When the processing is repeated, the score S is accumulated each time the processing program is activated to thereby calculate the score SK, as described with reference to step S5 in FIG. 2A.

In the processing program, the information of the processing conditions, the processing routes, processing product types, the processing time, the processing speed, and the machining tools is specified. To calculate the score S on the basis of the processing program, therefore, at least one of the mentioned factors, i.e., the processing conditions, the processing routes, processing product types, the processing time, the processing speed, and the machining tools, is looked up.

Regarding the processing conditions for example, rotation speed of the spindle of the processing machine, cutting depth of the blade, and the stroke of the machining table are described in the processing program. The score S is calculated on the basis of the processing program that has been activated, on the assumption that the chip production amount increases the higher the rotation speed of the spindle is and the deeper the cutting depth of the blade is. As a specific example, the evaluation of the cutting depth of the blade between 1 mm and 5 mm is denoted as minimum score "1". Then the minimum score is multiplied by a coefficient that differs depending on the cutting depth of the blade described in the processing program, to thereby calculate the score S.

Regarding the processing route, the score S is calculated on the basis of the processing program that has been activated, on the assumption that the chip production amount increases the longer the processing route along which the machining tool performs the processing is. For example, the evaluation of the processing route of a given length is denoted as minimum score "1". Then the minimum score is multiplied by a coefficient that differs depending on the length of the processing route acquired from the processing program, to thereby calculate the score S.

Regarding the processing product type, the chip deposition location, the chip shape, and the chip discharge amount vary depending on the shape of the work W and the material thereof, for example aluminum, cast iron, and zinc alloy. Practically, two works W different in shape or material are prepared, and processed under the same processing condition, along the same processing route, and with the same machining tool. After such processing, the chip deposition location, the chip shape, and the chip discharge amount may result different between the two works W. Therefore, the correlation between the processing product type and the chip discharge amount is defined in advance, with respect to a plurality of processing product types. Then the evaluation of a given processing product type is denoted as minimum score "1", and the minimum score is multiplied by a coefficient that differs depending on the processing product type acquired from the processing program, to thereby calculate the score S.

Regarding the processing time, the score S is calculated on the basis of the processing program that has been activated, on the assumption that the chip production amount increases in proportion to the processing time. For example, the evaluation of a given processing time is denoted as minimum score "1". Then the minimum score is multiplied by a coefficient that differs depending on the processing time acquired from the processing program, to thereby calculate the score S.

Regarding the processing speed, the chip discharge amount can be evaluated on the basis of the product of the rotation speed of the spindle and the blade feed amount. Accordingly, the evaluation of a predetermined value of the product of the rotation speed of the spindle and the blade feed amount is denoted as minimum score "1". Then the rotation speed of the spindle and the blade feed amount are read out from the processing program, and the minimum score is multiplied by a coefficient that differs depending on the product of the rotation speed of the spindle and the blade feed amount, to thereby calculate the score S.

Regarding the machining tool, the chip discharge amount varies depending on the type of the machining tool. Between milling and tapping, for example, a large amount of chips are produced from the milling, while the chip production amount from the tapping is relatively small. In addition, the chips are scattered over a wide range when the milling is performed, while the chip scattering range is relatively small when the tapping is performed. Accordingly, the evaluation of the machining tool used for the tapping is denoted as minimum score "1". Likewise, the correlation between the machining tool and the chip discharge amount is defined in advance, with respect to a plurality of machining tools. Then the type of the machining tool is read out from the processing program, and the minimum score is multiplied by a coefficient that differs depending on the machining tool, to thereby calculate the score S.

Hereunder, the preparation method of the chip collection program P1 will be described.

The chip collection programs P1 are prepared in advance in association with the respective processing programs and the chip collection programs P1 are stored in the processing machine control unit 2 or in the robot control unit 5. Although the content of the chip collection program P1 is stored in the robot control unit 5 in the first embodiment, the storage location of the chip collection program P1 is not specifically limited. Accordingly, whichever of the processing machine control unit 2 and the robot control unit 5 may serve as the subject to issue the instruction to collect the chips.

The chip collection program P1 may specify a range over which the chip collecting hand 3 is to be moved, as well as the motion of the chip collecting hand 3, with respect to the machining table 9 on which the chips are deposited. The motion range of the chip collecting hand 3 for collecting the chips is defined in association with the corresponding processing program.

As described earlier, the processing program contains the information of the processing conditions, the processing routes, processing product types, the processing time, the processing speed, and the machining tools. In addition, the chips produced during the processing of the work W are scattered from the processing route along which the work W is processed, and deposited on the work W and the periphery of the fixing jig 13, on the machining table 9. Therefore, the chip scattering range is defined on the basis of the information in the processing program with respect to each of the processing programs, on the assumption that the scattering range of the chips from the processing route varies depending on the processing programs. For example, a region of a predetermined width about the processing route is specified as chip scattering range.

Then the chip collection programs P1 are prepared for the respective processing programs, and the chip scattering range about the processing route is specified as motion range of the chip collecting hand 3, in each of the chip collection programs P1. Such chip collection programs P1 may be created through teaching or offline programming.

In addition, the chip collection program P1 contains the type of motion of the chip collecting hand 3 specified with respect to the structure and mechanism of the device selected as chip collecting hand 3. Although the chip collecting hand 3 is configured to grab or scoop the chips in the first embodiment, the present invention is not limited to such types of motion. When a work made of a magnetic metal is processed, the chip collecting hand 3 may be configured so as to adsorb the chips using an electromagnet. Further, a suction nozzle for sucking the chips may be attached to the chip collecting hand 3.

Second Embodiment

Hereunder, a second embodiment will be described. In the following description, the same constituents as those of the first embodiment will be given the same numeral, and differences from the first embodiment will be primarily described.

Figure 3:
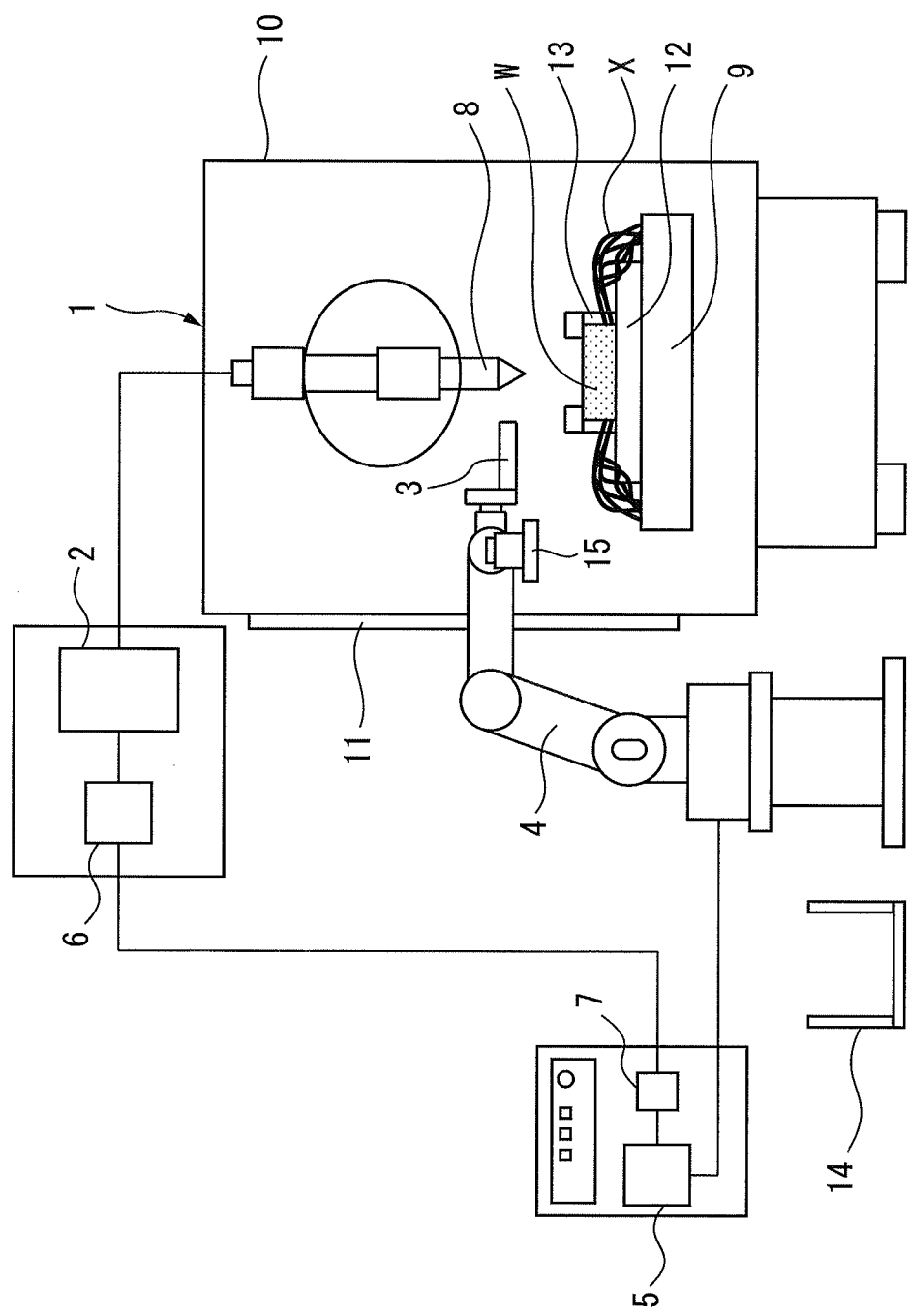
FIG. 3 is a schematic front view illustrating a processing machine system according to a second embodiment.

FIG. 3 is a schematic front view illustrating a processing machine system according to the second embodiment.

Referring to FIG. 3, the processing machine system according to the second embodiment further includes a visual sensor 15, in addition to the configuration of the processing machine system according to the first embodiment. The visual sensor 15 is located in the vicinity of the distal end portion of the robot 4. The visual sensor 15 picks up images of the work W being processed and the periphery thereof, on the machining table 9. In the second embodiment, the chip deposition region and the chip deposition amount on the machining table 9 are acquired from image data picked up by the visual sensor 15, and the chip collection is performed according to the deposition region and the deposition amount acquired as above.

Hereunder, the operation of the processing machine system according to the second embodiment will be described in details.

Figure 4A:
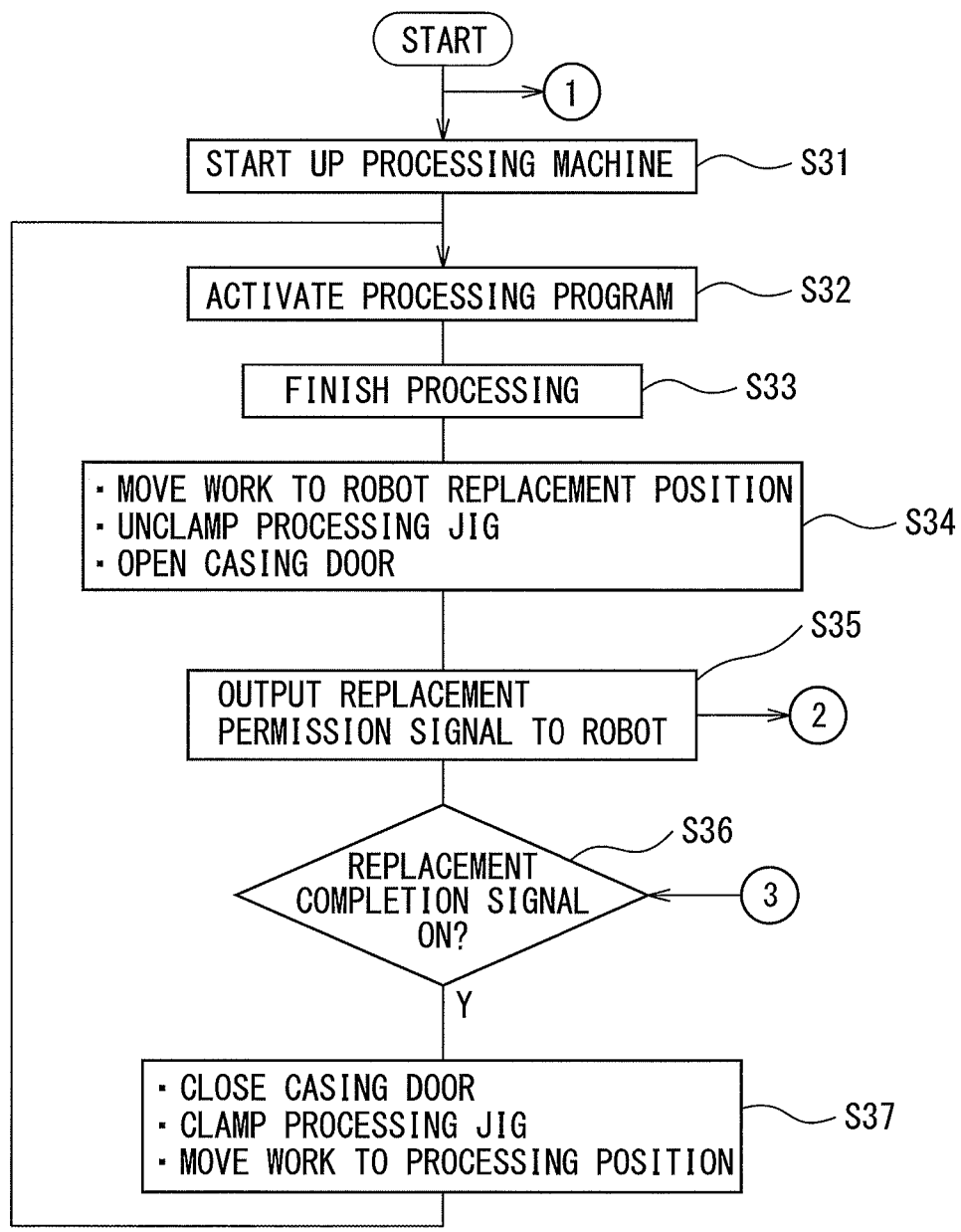
FIG. 4A is a flowchart representing a part of the operation flow of the processing machine system according to the second embodiment.
Figure 4B:
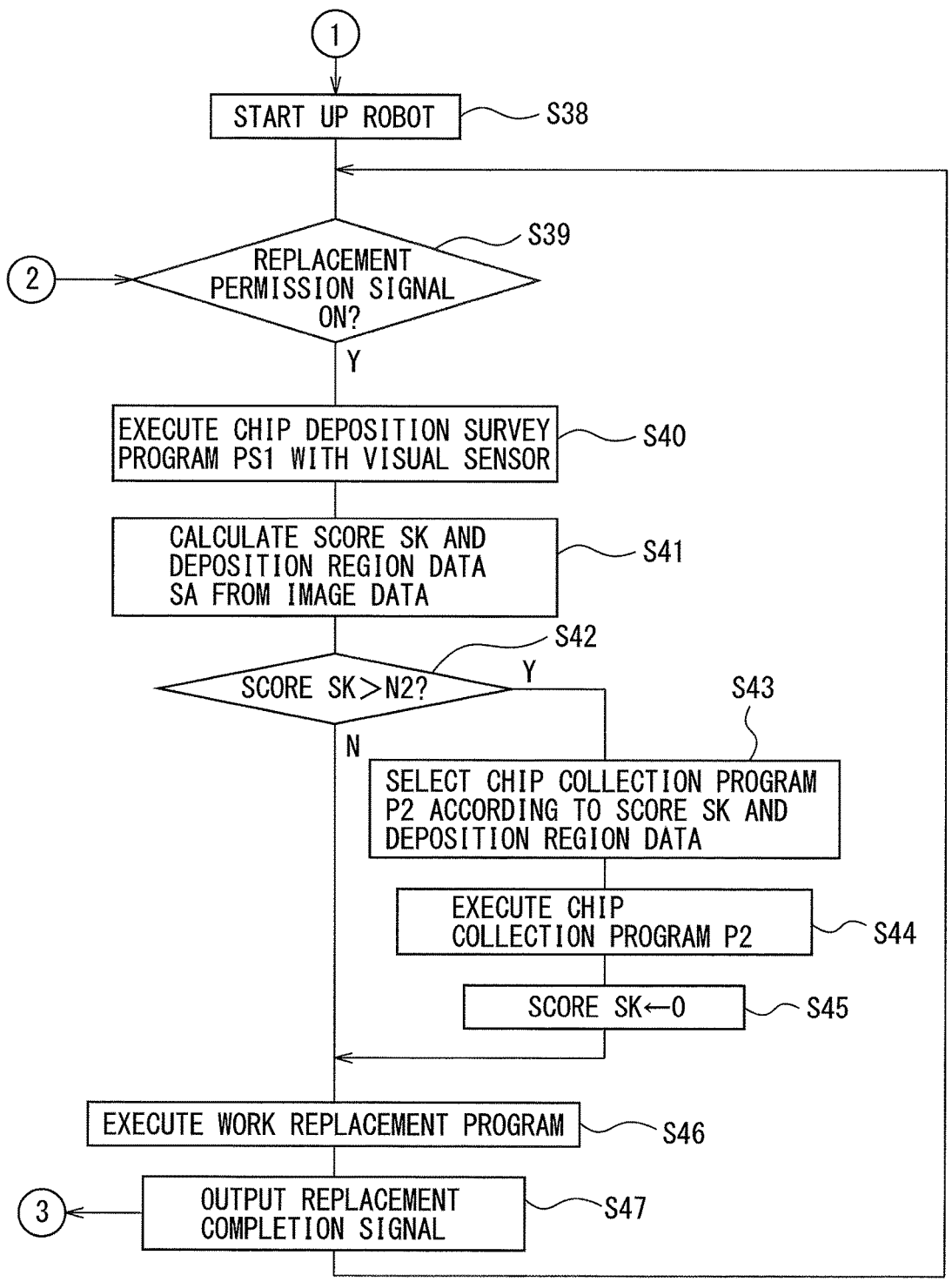
FIG. 4B is a flowchart representing the remaining part of the operation flow of the processing machine system according to the second embodiment.

FIG. 4A and FIG. 4B are flowcharts representing the operation flow of the processing machine system according to the second embodiment. Here, the operation flow of the processing machine system according to the second embodiment is dividedly illustrated in FIG. 4A and FIG. 4B. Connectors of the same numeral in FIG. 4A and FIG. 4B indicate the stages where the operation flows illustrated in the respective drawings are combined. It will be assumed that, in the initial state of the following operation flow, the chips are not present inside the processing machine 1, and that the unprocessed work W is held by the fixing jig 13.

When the operator presses a non-illustrated start button of the processing machine system, or a starting instruction is transmitted to the processing machine system from outside, the processing machine control unit 2 starts up the processing machine 1, so as to activate the machining tool 8 to start the processing of the work W (step S31 in FIG. 4A). In addition, the robot control unit 5 starts up the robot 4 (step S38 in FIG. 4B).

Then the processing machine control unit 2 activates the processing program corresponding to the processing of the work W (step S32 in FIG. 4A). Thereafter, the processing of the work W is completed when the processing program working thus far is finished (step S33 in FIG. 4A).

After step S33, the processed work W is replaced with an unprocessed work W. For this purpose, the processing machine control unit 2 drives the machining table 9 so as to place the processed work W at a non-illustrated work replacement position in the processing machine 1 (step S34 in FIG. 4A). In this embodiment, the processed work W is held by the clamp mechanism of the fixing jig 13 while being carried to the work replacement position. After the processed work W is moved to the work replacement position, the processing machine control unit 2 releases the processed work W from the clamp mechanism of the fixing jig 13. In addition, the processing machine control unit 2 opens the door 11 of the casing 10 of the processing machine 1.

Further, the processing machine control unit 2 outputs the replacement permission signal for permitting the replacement of the work W, to the robot control unit 5 (step S35 in FIG. 4A). The processing machine control unit 2 then stands by for the replacement completion signal indicating the completion of the replacement of the work W, from the robot control unit 5 (step S36 in FIG. 4A).

On the other hand, the robot 4 is ready to start the operation (step S38 in FIG. 4B). As illustrated in FIG. 4B, the robot control unit 5 checks whether the replacement permission signal has been inputted after step S38 (step S39 in FIG. 4B). Upon deciding that the replacement permission signal has been inputted, the robot control unit 5 activates the visual sensor 15 and also executes a chip deposition survey program PS1 (step S40 in FIG. 4B).

Thus, at step S40 the visual sensor 15 is introduced into the processing machine 1 once the processing is finished and the door 11 of the casing 10 of the processing machine 1 is opened (step S33 to step S35). Then the distal end portion of the robot with the visual sensor 15 attached thereto is made to move along the route that follows up the shape of the fixing jig 13, so that the visual sensor 15 picks up the image of the chips deposited on the work W and the periphery of the fixing jig 13. In the chip deposition survey program PS1, the route that follows up the shape of the fixing jig 13 is specified, as moving route of the visual sensor 15.

Since the visual sensor 15 is introduced into the processing machine 1 after the processing is finished, the image of the work W and the periphery of the fixing jig 13 can be shot while the chips are not being scattered. In other words, the visual field of the visual sensor 15 can be prevented from being disturbed by the chips, and hence degradation in image clarity of the visual sensor 15 can be prevented. Alternatively, the visual sensor 15 may be moved to a position where the entirety of the machining table 9 can be shot, and the image may be picked up from such a position.

Further, the robot control unit 5 calculates and acquires the score SK and deposition region data SA, using the image data picked up by the visual sensor 15 (step S41 in FIG. 4B). Then the robot control unit 5 compares the calculated score SK with a deposition limit N2 (step S42 in FIG. 4B). When the calculated score SK is higher than the deposition limit N2 as result of the comparison, the robot control unit 5 performs the chip collecting operation.

When the score SK is equal to or lower than the deposition limit N2 at step S42, it is decided that the chip collection is unnecessary. In this case, the work replacement program is executed immediately after step S42 (step S46 in FIG. 4B).

To acquire the deposition region data SA, the region along the processing route is shot by the visual sensor 15 before the chip deposition survey program PS1 is executed, and the image data of the region is stored in the robot control unit 5. Then through comparison of the image data between before and after the execution of the chip deposition survey program PS1, the region where the chips are deposited can be detected. Accordingly, the deposition region data SA can be generated on the basis of the detected region.

Further, not only the region on the machining table 9 where the chips are deposited, but also the height of the deposited chips can be detected, by shooting the fixing jig 13 with the visual sensor 15 both in vertical and horizontal directions with respect to the machining table 9. Accordingly, regarding the score SK, the evaluation of a given height of the chips may be denoted as minimum score "1", and the minimum score may be multiplied by a coefficient that differs depending on the detected height of the chips, to thereby calculate the score SK.

Then the robot control unit 5 looks up the score SK and the deposition region data SA thereby determining the chip collection program P2 (step S43 in FIG. 4B), to perform the chip collecting operation. More specifically, a plurality of chip collection programs P2 respectively associated with a plurality of items of the deposition region data SA are prepared in advance, and stored in the robot control unit 5. Further, the robot control unit 5 contains the calculated score SK and the deposition region data SA acquired at step S41, in association with each other. Therefore, when the score SK is inputted the robot control unit 5 can select the chip collection program P2 corresponding to the deposition region data SA, out of the plurality of chip collection programs P2.

In the chip collection program P2, the range over which the chip collecting hand 3 is to be moved with respect to the machining table 9, and the operation of the chip collecting hand 3 are specified.

Thus, the robot control unit 5 executes the chip collection program P2 (step S44 in FIG. 4B). The robot control unit 5 operates the robot 4 and the chip collecting hand 3 according to the chip collection program P2, thereby removing the chips on the machining table 9 inside the casing 10. More specifically, the chip collecting hand 3 of the robot 4 either grabs or scoops the chips in the casing 10 of the processing machine 1, and drops the chips into the dust box 14 located outside the casing 10.

After step S44, the robot control unit 5 initializes the score SK (step S45 in FIG. 4B). Then the robot control unit 5 executes the work replacement program (step S46 in FIG. 4B). The chip collecting hand 3 according to this embodiment possesses a grab function for replacing the work. Therefore, the robot control unit 5 can replace the processed work W on the work replacement position with an unprocessed work W, using the grab function of the chip collecting hand 3.

When the grab function is not provided in the chip collecting hand 3, the robot control unit 5 replaces the chip collecting hand 3 attached to the distal end portion of the robot 4 with a work replacing hand, using a non-illustrated hand changer. Then the work replacing hand replaces the processed work W on the work replacement position with the unprocessed work W. After the replacement of the work, the work replacing hand is replaced with the chip collecting hand 3.

After the replacement of the work W, the robot control unit 5 outputs the replacement completion signal to the processing machine control unit 2 (step S47 in FIG. 4B). On the other hand, the processing machine control unit 2 checks whether the replacement completion signal has been inputted (step S36 in FIG. 4A). When the replacement completion signal is inputted, the processing machine control unit 2 closes the door 11 of the casing 10 of the processing machine 1, and maintains the work W with the clamp mechanism of the fixing jig 13. Further, the processing machine control unit 2 drives the machining table 9 so as to move the work W from the work replacement position to the processing position (step S37 in FIG. 4A). The processing machine control unit 2 then returns to step S32, and activates the processing program corresponding to the unprocessed work W.

In the second embodiment described as above, the chip deposition amount and the deposition region are acquired with the visual sensor, and whether the chip collection is necessary is decided depending on the deposition amount thus acquired. When the chip collection is performed, the chips in the acquired deposition region are collected by the chip collecting hand of the robot, after the processing is finished. Thus, the chip collection is performed only when the chip collection is necessary after the processing is finished, and therefore the idle time can be reduced and the production efficiency can be improved. In addition, the work to be performed by the operator to stop the processing machine and remove the chips can be minimized. Therefore, long-time unmanned operation can be realized, which leads to reduction in production cost.

In the second embodiment, in particular, the chip deposition region is acquired from the image data shot by the visual sensor, and the chips in the acquired deposition region are collected by the robot. Thus, since the cleaning is performed only in the locations where the chip collection is necessary, useless cleaning time can be minimized, and consequently the production efficiency can be improved.

Third Embodiment

Hereunder, a third embodiment will be described. In the following description, the same constituents as those of the first or second embodiment will be given the same numeral, and differences from the first or second embodiment will be primarily described.

The processing machine system according to the third embodiment includes the same constituents as those of the second embodiment illustrated in FIG. 3.

In the third embodiment, however, the robot control unit 5 again executes the chip deposition survey program PS1 using the visual sensor 15, after executing the chip collection program P2, to thereby acquire the chip deposition amount and deposition region. When the chip deposition amount is larger than a predetermined value as result of the acquisition, the robot control unit 5 again executes the chip collection program P2. Further, the execution of the chip collection program P2 is repeated until the acquired chip deposition amount becomes smaller than the predetermined value.

Hereunder, the operation of the processing machine system according to the third embodiment will be described in details. However, the operation of the processing machine system according to the third embodiment is the same as that of the second embodiment except for the operation of the robot, and therefore only the operation of the robot, which is different from the second embodiment, will be described.

Figure 5:
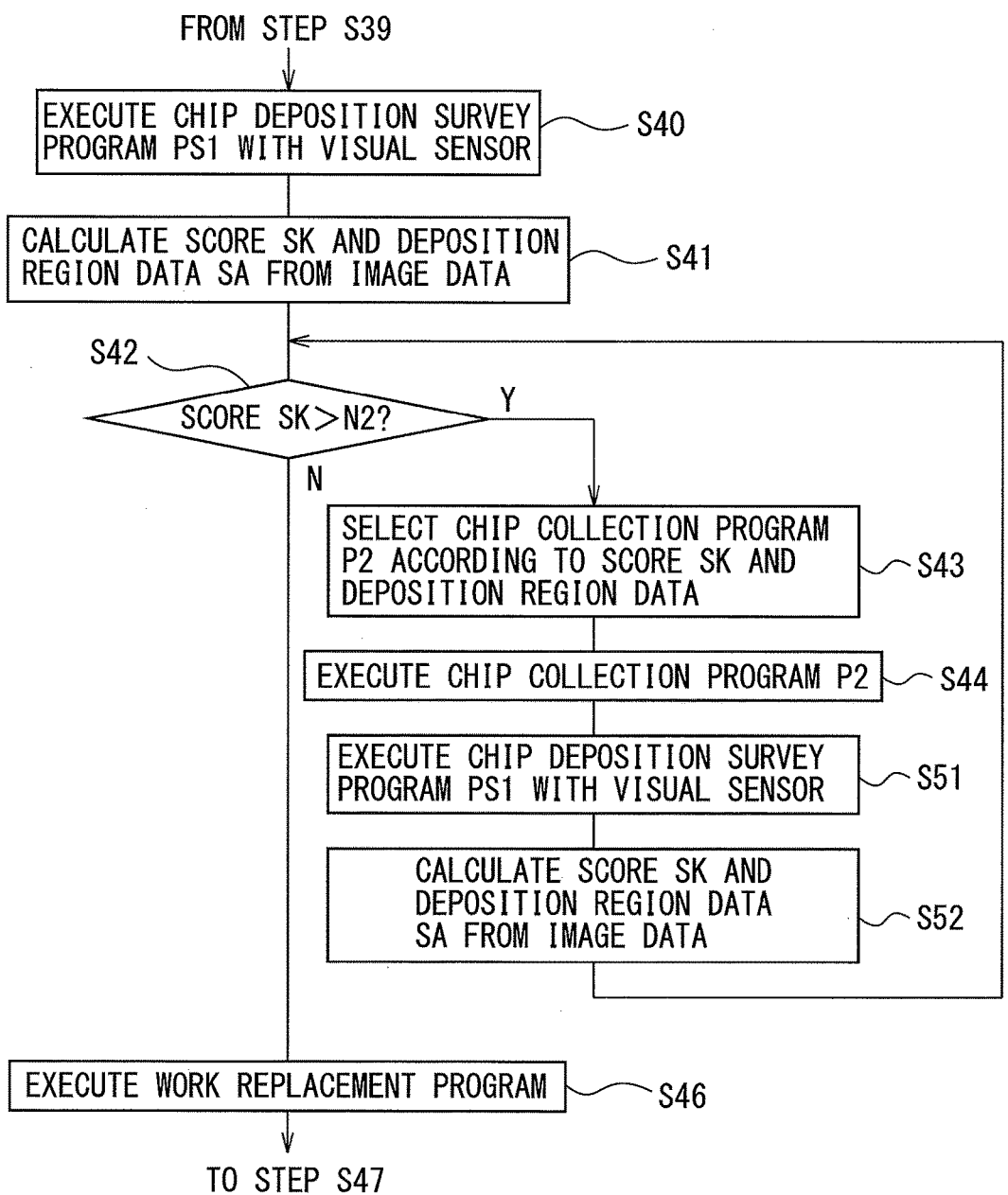
FIG. 5 is a flowchart representing a distinctive part of an operation flow of a robot included in a processing machine system according to a third embodiment.

FIG. 5 is a flowchart representing a distinctive part of the operation flow of the robot included in the processing machine system according to the third embodiment. FIG. 5 represents a substitution of the operation flow from step S40 to step 45 illustrated in FIG. 4B. Steps in FIG. 5 that are the same as those of FIG. 4B are given the same numeral.

As illustrated in FIG. 5, upon deciding that the replacement permission signal has been inputted, the robot control unit 5 activates the visual sensor 15 and also executes the chip deposition survey program PS1 (step S40 in FIG. 5). At step S40, the distal end portion of the robot with the visual sensor 15 attached thereto is made to move along the route that follows up the shape of the fixing jig 13, so that the visual sensor 15 picks up the image of the chips deposited on the work W and the periphery of the fixing jig 13. Here, in the chip deposition survey program PS1 the route that follows up the shape of the fixing jig 13 is specified, as moving route of the visual sensor 15.

Since the visual sensor 15 is introduced into the processing machine 1 after the processing is finished, the image of the work W and the periphery of the fixing jig 13 can be shot while the chips are not being scattered. In other words, the visual field of the visual sensor 15 can be prevented from being disturbed by the chips, and hence degradation in image clarity of the visual sensor 15 can be prevented. Alternatively, the visual sensor 15 may be moved to a position where the entirety of the machining table 9 can be shot, and the image may be picked up from such a position.

Further, the robot control unit 5 calculates and acquires the score SK and deposition region data SA, using the image data picked up by the visual sensor 15 (step S41 in FIG. 5). The calculation methods of the score SK and the deposition region data SA are the same as those of the second embodiment. After step S41, the robot control unit 5 compares the calculated score SK with the deposition limit N2 (step S42 in FIG. 5). When the calculated score SK is higher than the deposition limit N2 as result of the comparison, the robot control unit 5 performs the chip collecting operation.

Then the robot control unit 5 looks up the score SK and the deposition region data SA thereby determining the chip collection program P2 (step S43 in FIG. 5), to perform the chip collecting operation. More specifically, the plurality of chip collection programs P2 respectively associated with the plurality of items of the deposition region data SA are prepared in advance, and stored in the robot control unit 5. Further, the robot control unit 5 contains the calculated score SK and the deposition region data SA acquired at step S41, in association with each other. Therefore, when the score SK is inputted the robot control unit 5 can select the chip collection program P2 corresponding to the deposition region data SA, out of the plurality of chip collection programs P2.

In the chip collection program P2, the range over which the chip collecting hand 3 is to be moved with respect to the machining table 9, and the operation of the chip collecting hand 3 are specified.

Thus, the robot control unit 5 executes the chip collection program P2 (step S44 in FIG. 5). The robot control unit 5 operates the robot 4 and the chip collecting hand 3 according to the chip collection program P2, thereby removing the chips on the machining table 9 inside the casing 10. More specifically, the chip collecting hand 3 of the robot 4 scoops the chips in the casing 10 of the processing machine 1, and drops the chips into the dust box 14 located outside the casing 10.

After step S44, the robot control unit 5 again activates the visual sensor 15 and also executes the chip deposition survey program PS1 (step S51 in FIG. 5). Then the robot control unit 5 calculates and acquires the score SK and the deposition region data SA using the image data shot by the visual sensor 15 (step S52 in FIG. 5). The calculation methods of the score SK and the deposition region data SA are the same as those of the second embodiment.

The robot control unit 5 then compares the calculated score SK with the deposition limit N2 (step S42 in FIG. 5). When the calculated score SK is higher than the deposition limit N2 as result of the comparison, the robot control unit 5 again selects the chip collection program P2 corresponding to the deposition region data SA (step S43 in FIG. 5), and executes the selected chip collection program P2 (step S44 in FIG. 5).

Step S42, step S43, step S44, step S51, and step S52 are repeated until the calculated score SK becomes equal to or lower than the deposition limit N2. Therefore, the arrangement according to the third embodiment more effectively reduces the chips remaining in the processing machine, when compared with the second embodiment. The third embodiment is particularly useful when such an amount of chips that are unable to be collected at a time are deposited.

Thereafter, the robot control unit 5 executes the work replacement program (step S46 in FIG. 5). When the score SK is lower than the deposition limit N2 at step S42, it is decided that the chip collection is unnecessary. In this case, the work replacement program is executed immediately after step S42.

After the replacement of the work W, the robot control unit 5 outputs the replacement completion signal to the processing machine control unit 2 (step S47 in FIG. 5).

Fourth Embodiment

Hereunder, a fourth embodiment will be described. In the following description, the same constituents as those of the first to the third embodiments will be given the same numeral, and differences from the first to the third embodiments will be primarily described.

Figure 6:
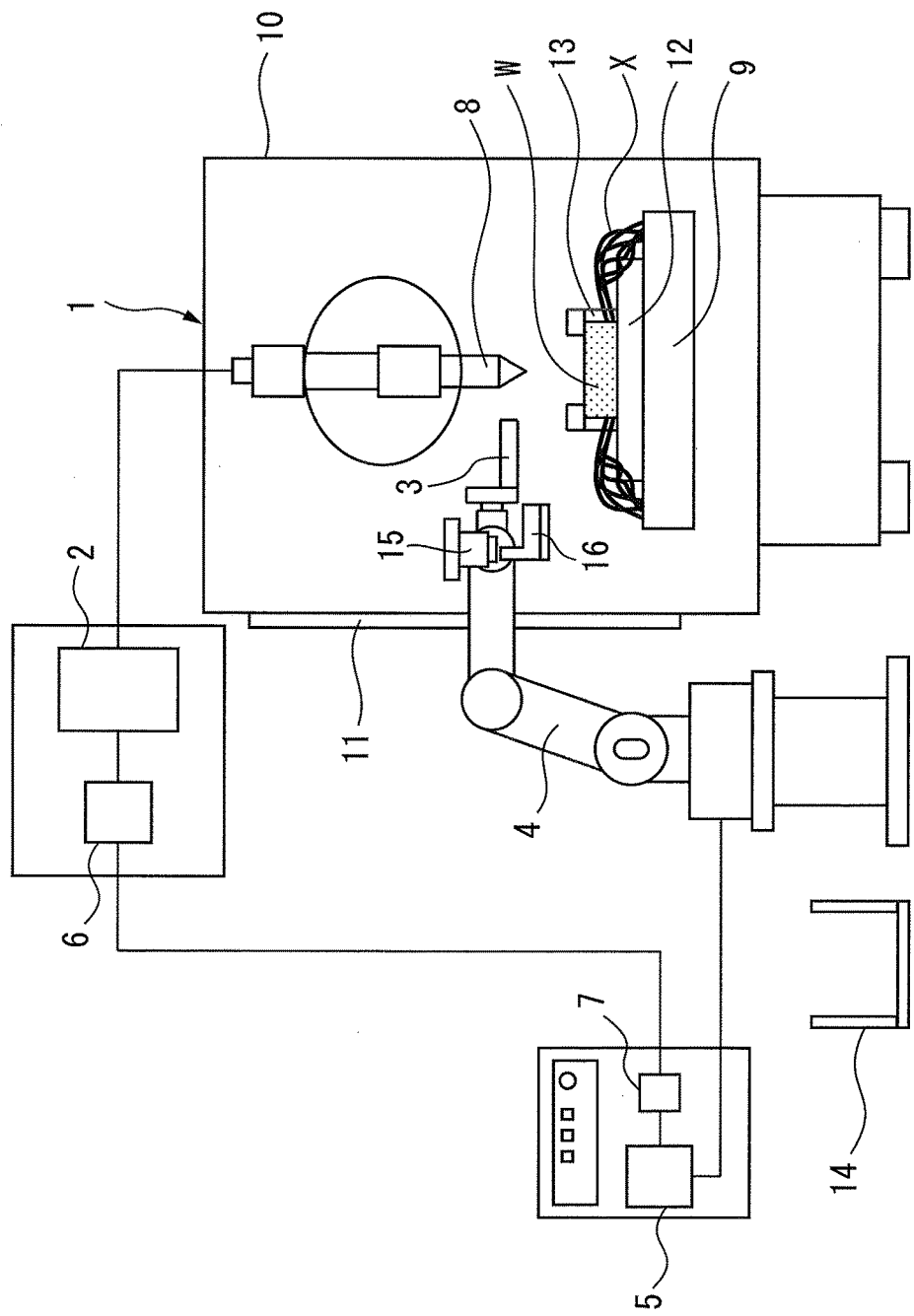
FIG. 6 is a schematic front view illustrating a processing machine system according to a fourth embodiment.

FIG. 6 is a schematic front view illustrating a processing machine system according to the fourth embodiment.

Referring to FIG. 6, the processing machine system according to the fourth embodiment further includes a cleaning brush 16, in addition to the configuration of the processing machine system according to the third embodiment. The cleaning brush 16 is also located in the vicinity of the distal end portion of the robot 4, like the visual sensor 15.

By moving the distal end portion of the robot 4, the pedestal 12 and the fixing jig 13 on the machining table 9 can be swept by the cleaning brush 16. Preferably, the cleaning brush 16 may be stored inside the distal end portion of the robot 4, to be driven outwardly from inside when the cleaning is to be performed. To drive the cleaning brush 16, an air cylinder or an electric motor may be employed.

Hereunder, the operation of the processing machine system according to the fourth embodiment will be described. However, the operation of the processing machine system according to the fourth embodiment is the same as that of the second and third embodiments except for the operation of the robot, and therefore only the operation of the robot, which is different from the second and third embodiments, will be described.

Figure 7:
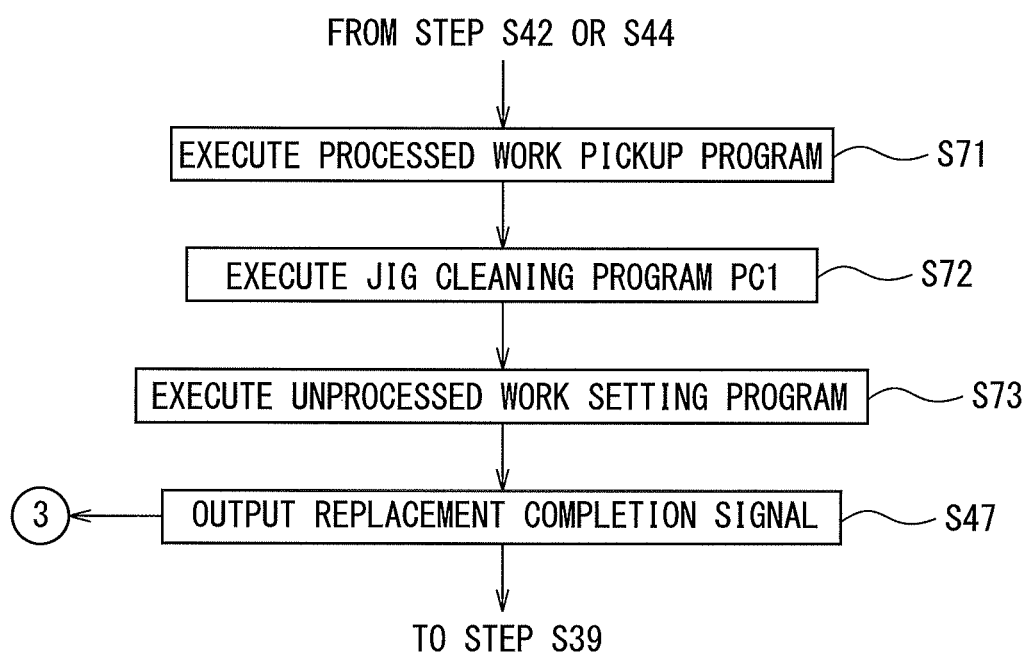
FIG. 7 is a flowchart representing a distinctive part of an operation flow of a robot included in a processing machine system according to the fourth embodiment.

FIG. 7 is a flowchart representing a distinctive part of the operation flow of the robot included in the processing machine system according to the fourth embodiment. FIG. 7 only represents substituted steps for step S46 illustrated in FIG. 4B and FIG. 5. In addition, step S47 in FIG. 7 is the same as step S47 in FIG. 4B.

Instead of step 45 in FIG. 4B and FIG. 5, the robot control unit 5 operates the robot 4 as described in step S71 to step S73 in FIG. 7. Specifically, the robot control unit 5 executes a processed work pickup program (step S71). Under this program, the robot control unit 5 removes the processed work W in the work replacement position from the fixing jig 13, using the grab function of the chip collecting hand 3. Then the robot control unit 5 drives the robot 4 so as to transport the processed work W out of the casing 10.

Thereafter, the robot control unit 5 executes a jig cleaning program PC1 for removing the chips deposited on the pedestal 12 of the fixing jig 13 (step S72). The jig cleaning program PC1 is stored in advance in the robot control unit 5, so as to control the movement and operation of the cleaning brush 16 in accordance with the shape of the fixing jig 13, the pedestal 12 inclusive. In this embodiment, the cleaning brush 16 is located outside the distal end portion of the robot 4, to cause the cleaning brush 16 to sweep away the chips on the pedestal 12 thus removing the chips therefrom.

When the work W is released from the fixing jig 13 while the chips still remain on the fixing jig 13, the chips may fall on the surface of the pedestal 12 where the work W has thus far been placed. In this case, when the unprocessed work W is placed on the pedestal 12 of the fixing jig 13 and fastened with the clamp mechanism, the chips may be caught between the pedestal 12 and the unprocessed work W. Accordingly, the unprocessed work W is not in close contact with the pedestal 12 but slightly spaced therefrom. When the unprocessed work W is processed in such a condition, the work W is formed into an unintended shape. Therefore, it is preferable to clean the fixing jig 13 after the work is removed. In this embodiment the robot 4 cleans the fixing jig 13 after the processed work W is removed, and therefore the production efficiency can be improved and long-time unmanned operation can be realized.

After the cleaning of the fixing jig 13, the robot control unit 5 executes an unprocessed work setting program (step S73). Under this program, the robot control unit 5 utilizes the grab function of the chip collecting hand 3 to place the unprocessed work W on the pedestal 12 of the fixing jig 13 located at the work replacement position. The unprocessed work W is then fixed by the clamp mechanism of the fixing jig 13.

After the replacement of the work W, the robot control unit 5 outputs the replacement completion signal to the processing machine control unit 2 (step S47 in FIG. 7).

Advantageous Effects of the Invention

In the first aspect of the present invention, the chip deposition amount on the machining table is detected, and it is decided whether the chip collection is necessary according to the detected deposition amount. In addition, when the chip collection is necessary the robot is activated to collect the chips with the chip collecting hand, after the processing is finished. Thus, the chip collection is performed only when the chip collection is necessary after the processing is finished, and therefore the idle time can be reduced and the production efficiency can be improved. In addition, the work to be performed by the operator to stop the processing machine and remove the chips can be minimized. Therefore, long-time unmanned operation can be realized, which leads to reduction in production cost.

In the second aspect of the present invention, the deposition amount of the chips on the machining table can be acquired using the information in the processing program. Such an arrangement eliminates the need to attach a device for detecting the chip deposition amount to the robot, thereby reducing the manufacturing cost of the processing machine system.

In the third aspect of the present invention, the chip deposition amount and deposition region on the machining table can be acquired with the visual sensor. In particular, the chip deposition amount and deposition region on the machining table can be accurately acquired, by shooting the image of the chips deposited on the machining table with the visual sensor. In addition, the cleaning is performed only in the locations where the chip collection is necessary, and therefore useless cleaning time can be minimized, and consequently the production efficiency can be improved.

In the fourth aspect of the present invention, the chip deposition amount and deposition region is again detected with the visual sensor after once collecting the chips, and when the chip collection is still necessary the chips in the deposition region are collected again. Such an arrangement assures that the chips deposited on the machining table are completely removed. The fourth aspect is particularly useful when such an amount of chips that are unable to be collected at a time are deposited.

In the fifth aspect of the present invention, the robot is located outside the casing of the processing machine, and the visual sensor is attached to the robot. Then the robot is activated so as to introduce the visual sensor into inside of the casing after the processing is finished, to acquire the chip deposition amount and deposition region. When the visual sensor is brought into inside of the casing of the processing machine during the processing, the chips may stick to the visual sensor thus degrading the image pickup accuracy of the visual sensor. In the fifth aspect, therefore, the image pickup accuracy of the visual sensor can be maintained at a desired level, and consequently the chip deposition amount and deposition region can be detected with high accuracy.

In the sixth aspect of the present invention, the robot releases the work from the fixing jig after the collecting the chips with the chip collecting hand, and then cleans the fixing jig with the cleaning brush. Accordingly, the chips are removed from the fixing jig, and the unprocessed work can be fixed in a correct posture with respect to the fixing jig. Such an arrangement minimizes defective formation of the work, thereby improving the production efficiency.

Although exemplary embodiments have been described as above, it is to be understood that the present invention is not limited to the foregoing embodiments, and different shapes, structures, and materials may be adopted without departing from the scope and spirit of the present invention.

The invention claimed is:

1. A processing machine system comprising:
a processing machine configured to process a work and including a machining table that holds the work;
a robot including a chip collecting hand that collects chips deposited on the machining table; and
a control unit that controls movement and operation of the chip collecting hand,
wherein the control unit is configured to: acquire a deposition amount and a deposition region of the chips produced from the processing of the work and deposited on the machining table; decide whether it is necessary to collect the chips on a basis of the acquired deposition amount; and cause the robot, upon deciding that chip collection is necessary, to operate according to the deposition region so as to collect the chips with the chip collecting hand, after the processing is finished.

2. The processing machine system according to claim 1, wherein the control unit is configured to acquire the deposition amount and the deposition region of the chips deposited on the machining table on a basis of information in a processing program utilized for processing the work.

3. The processing machine system according to claim 1, further comprising a visual sensor,
wherein the control unit is configured to: acquire, using the visual sensor, the deposition amount and the deposition region of the chips deposited on the machining table; and cause the robot, upon deciding that the chip collection is necessary, to collect the chips in the acquired deposition region with the chip collecting hand, after the processing is finished.

4. The processing machine system according to claim 3, wherein the control unit is configured to: acquire, using the visual sensor, the deposition amount and the deposition region of the chips deposited on the machining table after collecting the chips in the acquired deposition region with the chip collecting hand; decide whether it is necessary to collect the chips on a basis of the acquired deposition amount; and collect, upon deciding that chip collection is necessary, the chips in the deposition region with the chip collecting hand.

5. The processing machine system according to claim 3, wherein the visual sensor is attached to the robot, the robot being located outside a casing of the processing machine, and
the control unit is configured to cause the robot to acquire the deposition amount and the deposition region of the chips deposited on the machining table, so as to introduce the visual sensor into inside of the casing from outside after the processing is finished.

6. The processing machine system according to claim 1, further comprising:
a fixing jig that maintains the work, the fixing jig being mounted on the machining table; and
a cleaning brush movably attached to a distal end portion of the robot,
wherein the control unit is configured to cause the robot to remove the work from the fixing jig and configured to clean the fixing jig with the cleaning brush, after collecting the chips with the chip collecting hand.

\* \* \* \* \*